(12) United States Patent
Zawaideh et al.

(10) Patent No.: US 8,812,034 B2
(45) Date of Patent: Aug. 19, 2014

(54) METHODS AND APPARATUSES FOR MANAGEMENT OF SMS MESSAGE IDENTIFICATIONS IN A MULTI-MODE DEVICE

(75) Inventors: Fahed I. Zawaideh, San Diego, CA (US); Shyamal Ramachandran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 13/250,743

(22) Filed: Sep. 30, 2011

(65) Prior Publication Data

US 2013/0084897 A1 Apr. 4, 2013

(51) Int. Cl.
*H04W 4/14* (2009.01)
(52) U.S. Cl.
USPC ........................................ 455/466; 455/412.1
(58) Field of Classification Search
USPC ................................ 455/466, 412.1; 709/206
See application file for complete search history.

(56) References Cited

U.S. PATENT DOCUMENTS

| | | | |
|---|---|---|---|
| 6,597,918 B1 | 7/2003 | Kim | |
| 6,885,870 B2 | 4/2005 | Aho | |
| 7,844,285 B2 | 11/2010 | Lorello et al. | |
| 7,903,637 B2 | 3/2011 | Moore et al. | |
| 2003/0114178 A1 | 6/2003 | Walsh et al. | |
| 2004/0203945 A1* | 10/2004 | Qu et al. | 455/466 |
| 2004/0205769 A1* | 10/2004 | Ruutu | 719/313 |
| 2008/0004046 A1 | 1/2008 | Mumick et al. | |
| 2008/0005228 A1 | 1/2008 | Subbian | |
| 2010/0070588 A1* | 3/2010 | Sinn et al. | 709/206 |

OTHER PUBLICATIONS

"3rd Generation Partnership Project; Technical Specification Group Core Network and Terminals; Technical realization of the Short Message Service (SMS) (Release10)", 3GPP Standard; 3GPP TS 23.040, 3rd Generation Partnership Project (3GPP), Mobile Competence Centre ; 650, Route Des Lucioles ; F-06921 Sophia-Antipolis Cedex; France, No. V10.0.0, Apr. 1, 2011, pp. 1-202, XP050476761, [retrieved on Apr. 1, 2011] paragraphs [9.2.1], [9.3.1].
International Search Report and Written Opinion—PCT/US2012/057564—ISA/EPO—Apr. 2, 2013.

* cited by examiner

*Primary Examiner* — Jinsong Hu
*Assistant Examiner* — Jean Chang
(74) *Attorney, Agent, or Firm* — Patterson & Sheridan, L.L.P.

(57) ABSTRACT

Aspects of the present disclosure propose systems and methods for managing assignment of short message service (SMS) message identifications (IDs) in a multimode device (e.g., mobile station). The proposed methods ensure that a unique message ID is assigned to each SMS transmitted by the mobile station (MS). Each retransmission of the SMS messages may be assigned a message ID similar to or the same as the previous transmission(s) of the SMS message. As a result, a network messaging center may be able to identify duplicate SMS messages that are marked with unique message IDs even if they are transmitted on different air interfaces and/or by different modems (modulators/demodulators).

34 Claims, 8 Drawing Sheets

METHODS AND APPARATUSES FOR MANAGEMENT OF SMS MESSAGE IDENTIFICATIONS IN A MULTI-MODE DEVICE

TECHNICAL FIELD

Certain aspects of the present disclosure generally relate to short message service (SMS) message generation and transmission, and in particular, to methods and systems for management of SMS message identifications (IDs) in a multi-mode device.

BACKGROUND

Wireless communication systems are widely deployed to provide various types of communication content such as voice, data, and so on. These systems may be multiple-access systems capable of supporting communications with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems, Orthogonal Frequency Division Multiple Access (OFDMA) systems, and the like.

Wireless communication systems may include multimode devices that are capable of operating simultaneously or individually on various air interface technologies. The multimode devices may utilize one or more modems (modulators/demodulators) and one or more application processors. Multiple clients may run on each of the modems or application processors, each of which may utilize various services, such as short message service (SMS).

Generally, a client may specify a message identification (ID) for a SMS message. Some collisions may occur in the message ID space when the client has control over its own message IDs but does not have control over message IDs of other clients. In addition, the SMS message may be retransmitted on different modems and/or on different air interfaces in case of failure or a network timeout. A network may be unable to detect duplicate messages when a message is received twice from the same MS on different air interfaces with different SMS message IDs.

SUMMARY

Certain aspects of the present disclosure provide a method for wireless communications by a multimode mobile station (MS). The method generally includes receiving a request to send a short message service (SMS) message from a client within the MS, wherein the request comprises a client message identification (ID), mapping the client message ID to a controller message ID by a SMS message controller, wherein the controller message ID is uniquely defined for each SMS message that is transmitted by the MS, generating an SMS message based at least on the controller message ID, and transmitting the SMS message over the air.

Certain aspects of the present disclosure provide a method for wireless communications by a multimode mobile station (MS). The method generally includes receiving, from a client within the MS, a request for a message identification (ID), assigning a controller message ID to the client by a short message service (SMS) message controller, receiving a SMS message from the client comprising the controller message ID, wherein the controller message ID uniquely defines the SMS message, and transmitting the SMS message over the air.

Certain aspects of the present disclosure provide a method for wireless communications by a multimode mobile station (MS). The method generally includes assigning one of one or more sets of message identifications (IDs) to one of one or more clients by a short message service (SMS) message controller, receiving a SMS message from the client, wherein the SMS message comprises a message ID from the set of message IDs assigned to the client, and transmitting the SMS message over the air.

Certain aspects of the present disclosure provide an apparatus for wireless communications. The apparatus generally includes a SMS message controller configured to receive a request to send a short message service (SMS) message from a client within the apparatus, wherein the request comprises a client message identification (ID), map the client message ID to a controller message ID, wherein the controller message ID is uniquely defined for each SMS message that is transmitted by the apparatus, and generate an SMS message based at least on the controller message ID, and a transmitter configured to transmit the SMS message over the air.

Certain aspects of the present disclosure provide an apparatus for wireless communications. The apparatus generally includes a short message service (SMS) message controller configured to receive, from a client within the apparatus, a request for a message identification (ID), assign a controller message ID to the client, receive a SMS message from the client comprising the controller message ID, wherein the controller message ID uniquely defines the SMS message, and a transmitter configured to transmit the SMS message over the air.

Certain aspects of the present disclosure provide an apparatus for wireless communications. The apparatus generally includes a short message service (SMS) message controller configured to assign one of one or more sets of message identifications (IDs) to one of one or more clients, and receive a SMS message from the client, wherein the SMS message comprises a message ID from the set of message IDs assigned to the client, and a transmitter configured to transmit the SMS message over the air.

Certain aspects provide a computer-program product for wireless communications by a multimode mobile station (MS), comprising a computer-readable medium having instructions stored thereon, the instructions being executable by one or more processors. The instructions generally include instructions for receiving a request to send a short message service (SMS) message from a client within the MS, wherein the request comprises a client message identification (ID), instructions for mapping the client message ID to a controller message ID by a SMS message controller, wherein the controller message ID is uniquely defined for each SMS message that is transmitted by the MS, instructions for generating an SMS message based at least on the controller message ID, and instructions for transmitting the SMS message over the air.

Certain aspects provide a computer-program product for wireless communications by a multimode mobile station (MS), comprising a computer-readable medium having instructions stored thereon, the instructions being executable by one or more processors. The instructions generally include instructions for receiving, from a client within the MS, a request for a message identification (ID), instructions for assigning a controller message ID to the client by a short message service (SMS) message controller, instructions for receiving a SMS message from the client comprising the controller message ID, wherein the controller message ID uniquely defines the SMS message, and instructions for transmitting the SMS message over the air.

Certain aspects provide a computer-program product for wireless communications by a multimode mobile station (MS), comprising a computer-readable medium having instructions stored thereon, the instructions being executable by one or more processors. The instructions generally include instructions for assigning one of one or more sets of message identifications (IDs) to one of one or more clients by a short message service (SMS) message controller, instructions for receiving a SMS message from the client, wherein the SMS message comprises a message ID from the set of message IDs assigned to the client, and instructions for transmitting the SMS message over the air.

Certain aspects of the present disclosure provide an apparatus for wireless communications. The apparatus generally includes at least one processor and a memory coupled to the at least one processor. The at least one processor is configured to receive a request to send a short message service (SMS) message from a client within the apparatus, wherein the request comprises a client message identification (ID), map the client message ID to a controller message ID by a SMS message controller, wherein the controller message ID is uniquely defined for each SMS message that is transmitted by the apparatus, and generate an SMS message based at least on the controller message ID, transmit the SMS message over the air.

Certain aspects of the present disclosure provide an apparatus for wireless communications. The apparatus generally includes at least one processor and a memory coupled to the at least one processor. The at least one processor is configured to receive, from a client within the apparatus, a request for a message identification (ID), assign a controller message ID to the client by a short message service (SMS) message controller, receive a SMS message from the client comprising the controller message ID, wherein the controller message ID uniquely defines the SMS message, and transmit the SMS message over the air.

Certain aspects of the present disclosure provide an apparatus for wireless communications. The apparatus generally includes at least one processor and a memory coupled to the at least one processor. The at least one processor is configured to assign one of one or more sets of message identifications (IDs) to one of one or more clients by a short message service (SMS) message controller, receive a SMS message from the client, wherein the SMS message comprises a message ID from the set of message IDs assigned to the client, and transmit the SMS message over the air.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Certain aspects of the present disclosure propose systems and methods for managing assignment of short message service (SMS) message identifications (IDs) in a multimode device, such as a mobile station (MS) which may also be referred to as a user equipment UE.

The proposed methods may help ensure that a unique message ID is assigned to each SMS transmitted by the mobile station (MS). Each retransmission of the SMS messages may be assigned a message ID similar to or the same as the previous transmission(s) of the SMS message. As a result, a network messaging center may be able to identify duplicate SMS messages that are marked with unique message IDs even if they are transmitted on different air interfaces and/or by different modems (modulator-demodulators).

It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The techniques described herein may be used for various wireless communication networks such as code division multiple access (CDMA), time division multiple access (TDMA), frequency division multiple access (FDMA), orthogonal frequency division multiple access (OFDMA), single carrier frequency division multiple access (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA 2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below. It should be noted that the descriptions are also applicable to other technologies with different terminologies.

Figure 1:
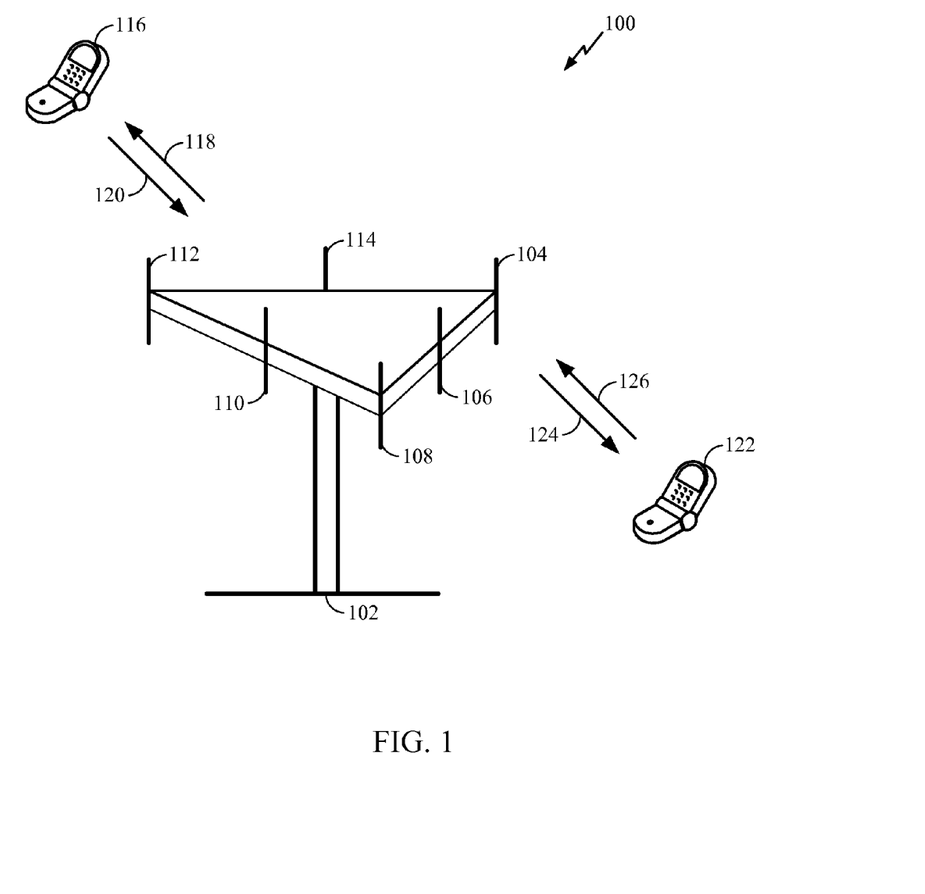
FIG. 1 illustrates an example wireless communication network, in accordance with certain aspects of the present disclosure.

FIG. 1 shows a wireless communication network 100 in which an MS capable of performing SMS operations described herein may receive service.

The network 100 may be, for example, an LTE network or some other wireless network. Wireless network 100 may include a number of evolved Node Bs (eNBs) 102 (only one is shown for simplicity), a plurality of mobile stations 116, 122 and other network entities. Different eNBs may use the same type of or different radio access technologies (RATs). The mobile stations (MSs) shown in the Figure may perform the operations described herein.

The eNB 102 includes multiple antenna groups, one including 104 and 106, another including 108 and 110, and an additional including 112 and 114. In FIG. 1, only two antennas are shown for each antenna group, however, more or fewer antennas may be utilized for each antenna group. Mobile station 116 is in communication with antennas 112 and 114, where antennas 112 and 114 transmit information to mobile station 116 over forward link 120 and receive information from mobile station 116 over reverse link 118. Mobile station 122 is in communication with antennas 106 and 108, where antennas 106 and 108 transmit information to mobile station 122 over forward link 126 and receive information from mobile station 122 over reverse link 124. In a Frequency Division Duplex (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the eNB. In an aspect, antenna groups each are designed to communicate to mobile stations in a sector of the areas covered by eNB 102.

An eNB may be a fixed station used for communicating with the mobile stations and may also be referred to as a Node B, an access point (AP), a base station, or some other terminology. In a wireless network, different eNBs may operate under different radio access technologies (e.g., LTE, CDMA and the like). There may be some overlap in the coverage area of different eNBs. The mobile stations 116, 122 may be capable of operating under two or more radio access technologies (e.g., multimode devices).

The mobile stations may be dispersed throughout wireless network 100, and each MS may be stationary or mobile. A MS may also be referred to as a terminal, a user equipment (UE), a subscriber unit, a station, etc. A MS may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. The MSs shown in FIG. 1 may use a variety of services such as sending SMS messages to other nodes in the network (e.g., eNBs or other MSs).

Figure 2:
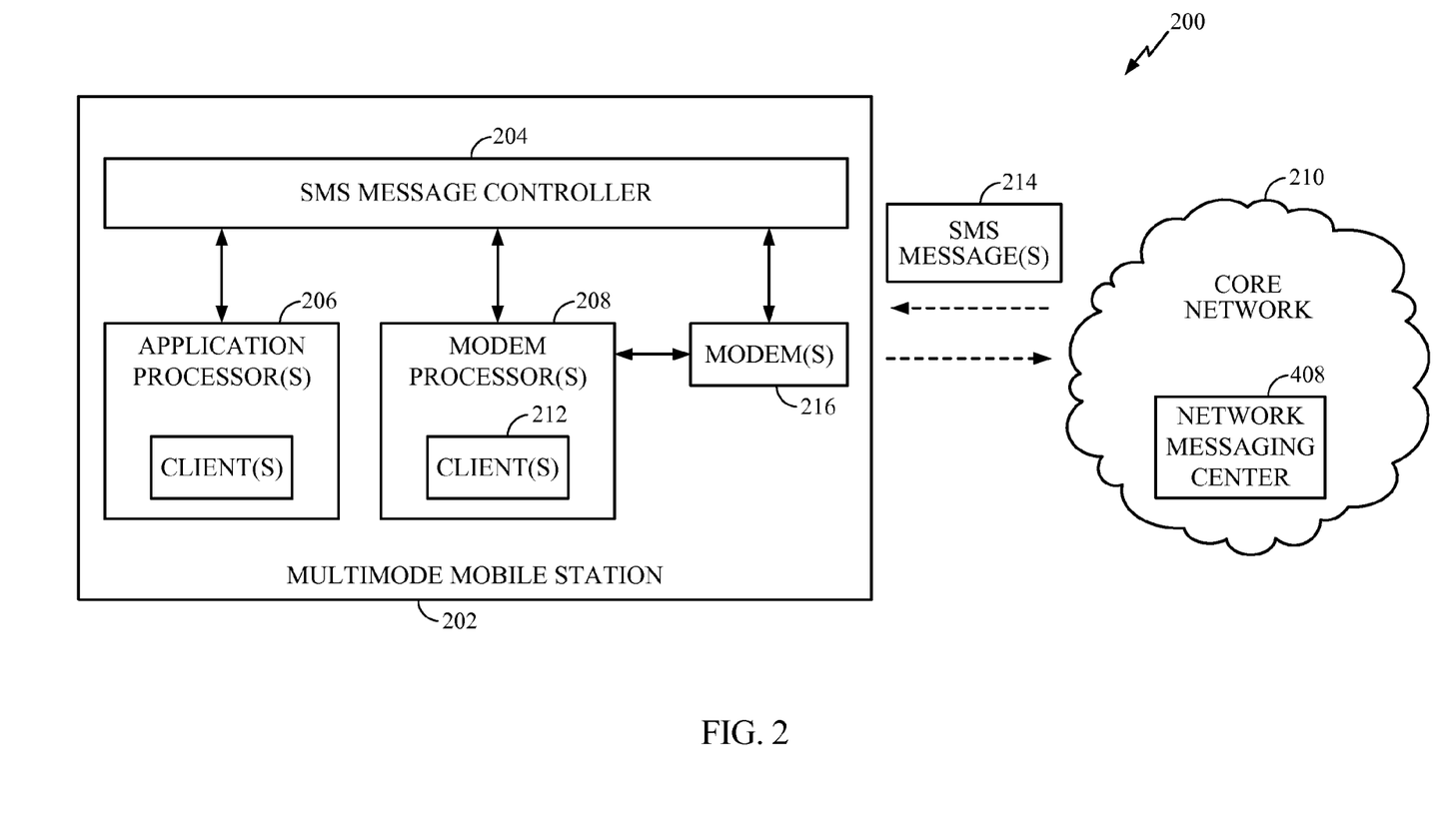
FIG. 2 illustrates an example network including a multimode mobile station, in accordance with certain aspects of the present disclosure.

FIG. 2 illustrates an example communications system 200 including a multimode mobile station (MS) 202 capable of performing SMS operations in accordance with various aspects of the present disclosure.

As illustrated, MS 202 may be communicating with a core network 210 that has a SMS. The core network can be, for example, a wireless or cellular communication network utilizing any suitable wireless communication technology or combination thereof (e.g., UTRA, E-UTRA, UMTS, LTE, GSM, CDMA2000, UMB, Wi-Fi, WiMAX or the like).

The multimode MS may have one or more clients 212 capable of generating and transmitting SMS messages 214 (or any other type of messages) to other nodes in the network. As illustrated the MS may include one or more modems 216, each controlled by a modem processor 208 and capable of interacting with one or more application processors 206, a SMS message controller 204 and other components.

The modems 216 may utilize the same type of or different air interfaces to transmit signals (and/or messages) over the air via different radio access networks (RANs). The multimode MS may use different SMS transport mechanism over different air interfaces (e.g., Internet Protocol (IP) Multimedia Subsystem). The modem processors 208 may manage air interface protocol operations (e.g., by controlling modems 216 and other suitable components) with respect to the communication with the core network 210.

The application processors 206 may manage operating system functions of the mobile station 202 and/or respective applications running thereon. The SMS message controller 204 may interact with other components in the mobile station (e.g., application processors, modem processors, clients residing on the processors, and the like) to manage assignment of unique message IDs to the messages transmitted by the MS.

In general, one or more clients 212 (e.g., applications) may reside on each modem processor 208 or each application processor 206 of the MS. Some of these clients may need to send and/or receive SMS messages. The clients residing on the MS may send different kinds of SMS messages to a destination device (e.g., another MS or an eNB). For example, the clients may send user-initiated SMS messages, or they may send other types of SMS messages that are not controlled by the user, such as SMS messages containing positioning information, usage statistics, initialization information and the like.

The core network may include a network messaging center 408, one or more eNBs, and other components. The network messaging center 408 may receive the SMS messages 214 transmitted by the MS and redirect the SMS messages to their corresponding destination node (e.g., MS, eNB and the like). The network messaging center may also store the received SMS messages if the destination node is out of reach (e.g., if a MS is off) and deliver the SMS message at a later time. In addition, the network messaging center may try to identify duplicate messages (e.g., messages that are received more than once) and discard extra copies of the SMS message.

Traditionally, a client inside each MS may specify a message ID for a SMS message. Some collisions may occur in the message ID space when the client has control over its own message IDs but does not have control over message IDs of other clients of the MS. In addition, some of the clients residing on a MS may implement a retry mechanism where the SMS message is retried on different modems and/or on a different air interface in case of failure or timeout.

Unfortunately, if message IDs are not aligned (e.g., properly coordinated between clients), the MS may send the same SMS message multiple times on different modems and/or different air interfaces, but with different message IDs. This may cause SMS "duplicate" detection issues at the network messaging center. For example, the SMS messaging center may not be able to identify the "duplicate" messages if they have different SMS IDs. A "duplicate" message may be received by a network messaging center if a prior transmission of a message succeeded but an acknowledgement (ACK) did not reach the originating MS that resulted in a re-transmission of the same SMS message.

As an example, an MS (or a client inside an MS) may transmit a SMS message with a specific ID (e.g., 001). In case of a failure, the MS may retransmit the same SMS message with a different ID (e.g., 002) from a second modem that utilizes a same type of air interface or a different air interface. Although the content of these two SMS messages is the same, the network messaging center may not be able to differentiate them if a retransmission of the SMS message has a different ID. The network messaging center may then transmit both of the SMS messages (e.g., the original and the copy of the SMS message) to the destination node.

This may cause a number of issues, ranging from end user confusion to billing problems for the MS or the subscriber (e.g., the subscriber/end user may receive and may be billed for two SMS messages).

Mapping Unique Message IDs by a Controller

Techniques presented herein, however, provide a measure of assurance that not only are unique SMS message IDs are assigned to all the messages transmitted by an MS, but that the same message IDs are used for re-transmissions-even in the event the re-transmission occurs on a different air interface. This may help ensure correct detection of duplicate messages at the network messaging center.

For certain aspects of the present disclosure, a centralized SMS message controller (e.g., the SMS message controller 204) on the MS may be used as a central entity to manage assignment of SMS message IDs generated by different clients. Thus, the SMS message controller 204 may interface with clients on the MS that are capable of sending SMS messages.

The SMS message controller may assign unique message IDs to each of the SMS messages transmitted by the mobile station, regardless of the client that is initiating the SMS message. For example, the SMS message controller may have a pool of message IDs that are uniquely defined for the mobile station and assign one of the message IDs from this pool to each of the SMS messages transmitted by the mobile station.

Figure 3:
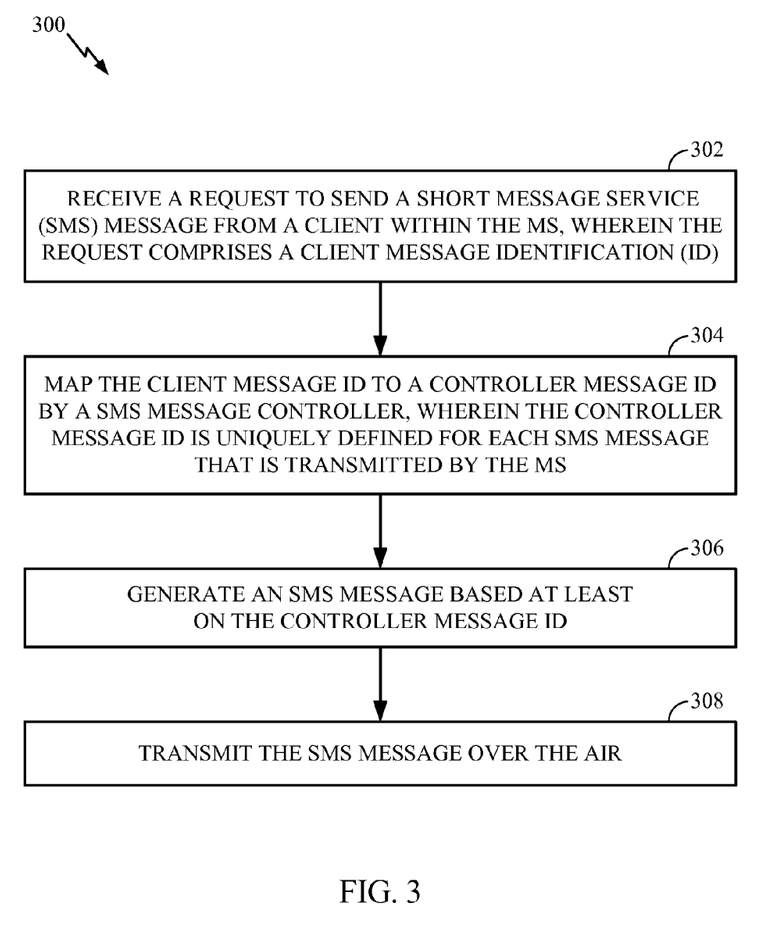
FIG. 3 illustrates example operations that may be performed by a multimode mobile station for management of message identifications (IDs), in accordance of certain aspects of the present disclosure.

FIG. 3 illustrates example operations that may be performed by a multimode MS for management of message IDs, in accordance of certain aspects of the present disclosure.

At 302, an SMS message controller in the MS may receive a request to send a short message service (SMS) message from a client within the MS. In general, the client may be an operating system client, an application residing on an application processor, an application residing on a modem processor, a user-initiated client or any other types of clients. The request to send the SMS message may also include information regarding whether or not the SMS message is being retransmitted. Each client may submit a client message ID, and a client ID with each SMS message request to the SMS message controller.

At 304, the SMS message controller may map the client message ID to a different message ID generated by the SMS message controller (e.g., controller message ID). The controller message ID may uniquely be defined for each SMS message that is transmitted by the MS and may be selected from the pool of unique message IDs.

At 306, the SMS message controller (or another component in the mobile station) may generate an SMS message based at least on the controller message ID. For certain aspects, the SMS message controller may be responsible for constructing fields of the SMS message corresponding to the teleservice layer and/or the transport layer. At 308, the MS may transmit the SMS message over the air. The controller message ID may be used in the SMS message that is sent over the air.

Figure 4:
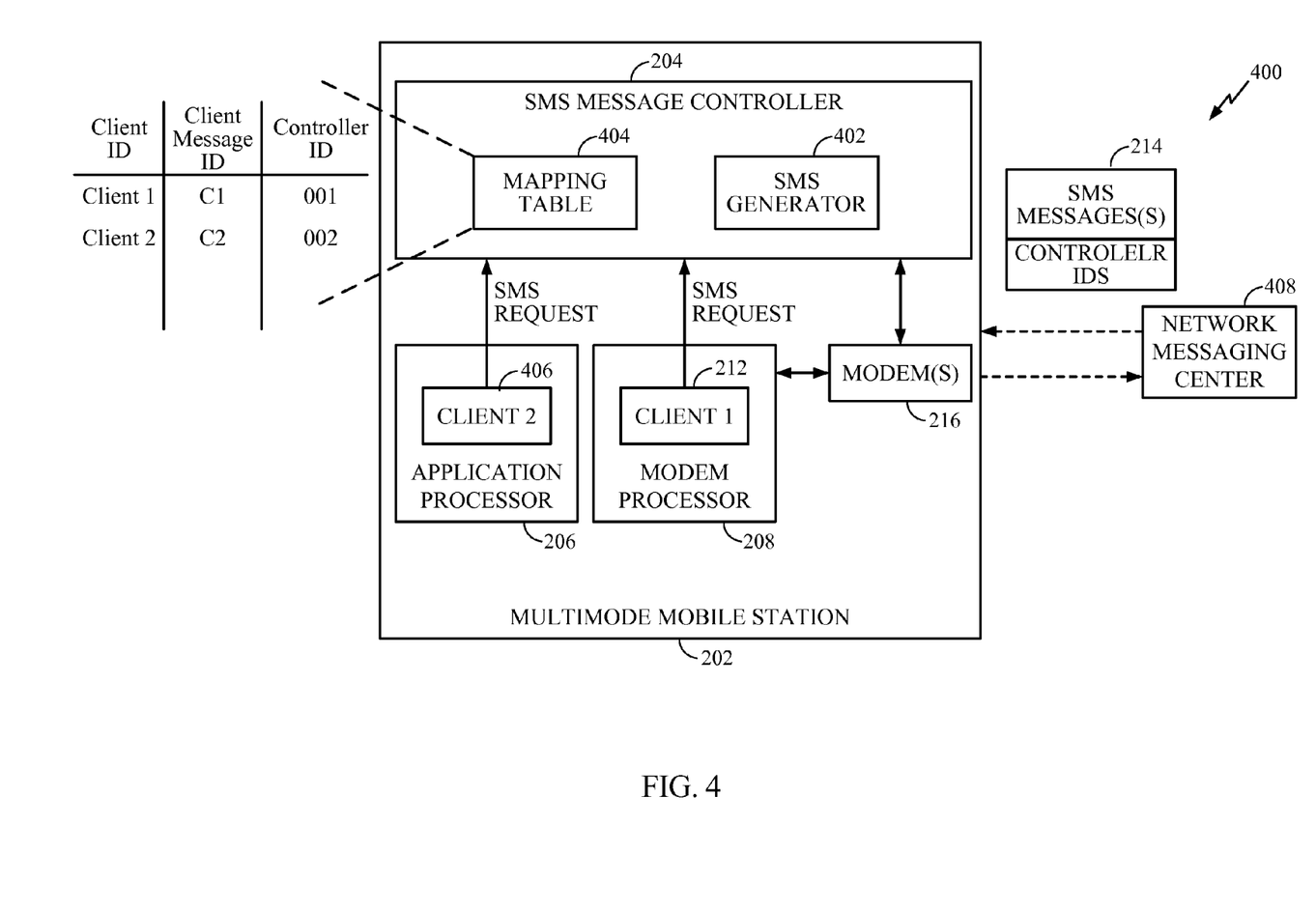
FIG. 4 illustrates an example multimode MS that manages assignment of unique message IDs to SMS messages by performing operations illustrated in FIG. 3, in accordance of certain aspects of the present disclosure.

FIG. 4 illustrates an example multimode MS 202 that manages assignment of unique controller message IDs to SMS messages by performing operations illustrated in FIG. 3.

In the illustrated example, a client 212 residing on a modem processor 208 may send a request for sending a SMS message to the SMS message controller 204. The SMS message controller may assign a controller message ID (e.g., controller ID 001) to the SMS message corresponding to the client 212. The SMS message controller may also update a mapping table 404 with the client ID (e.g., client 1) and client message ID (e.g., C1), controller ID (e.g., 001) and other information corresponding to the SMS message (e.g., to keep track of which controller IDs are assigned to which clients). A SMS generator 402 inside the SMS message controller may then generate an SMS message utilizing the assigned controller message ID and other information provided by the client 212.

The example in FIG. 4 also shows how another client 406 that resides on an application processor 206 may send a request for sending a SMS message to the SMS message controller 204. The SMS message controller may assign another unique controller ID (e.g., controller ID 002) to the client 406. The SMS message controller may also update the mapping table 404 with information corresponding to the second request received from the client 406. The SMS generator 402 may then generate an SMS message utilizing the assigned controller message ID (e.g., 002) and other information provided by the client 406. The mobile station may transmit the SMS message over the air using a modem.

For certain aspects, the SMS message controller may send a failure indication to the client if transmission of the SMS message fails on a modem, or a time-out happens. The SMS message controller may receive a request from a client to re-send the SMS message if there is a failure in transmission of the SMS message. The request may include the client message ID.

For example, if the client 406 in FIG. 4 may want to retransmit a SMS message (e.g., SMS message with client message ID C2), the SMS message controller may re-assign the same controller message ID (e.g., 002) that was assigned to the first transmission of the SMS message for the retransmission of the SMS message. The SMS message controller may reuse the same controller message ID (e.g., 002) that was assigned to a prior transmission of the SMS message (which is known by its client message ID) to the retransmission of the SMS message.

As an alternative, the client may reuse the same controller message ID (e.g., 002) for retransmission of the SMS message (e.g., C2) and directly send the SMS message to a modem for transmission.

In either case, the network Messaging Center may be able to detect duplicate messages (if any) that have similar or the same controller message IDs. A duplicate message may happen if a prior transmission of a message succeeded but an acknowledgement (ACK) did not reach the originating MS that resulted in the re-transmission. The network messaging center may not forward the SMS message to an end destination when it detects that the message is a copy of another message.

For certain aspects, the network messaging center may compare the controller message ID, the destination address and the originating address of the SMS message to mark the message as "duplicate". So, the unique controller message ID enables the network messaging center to avoid transmission of duplicate messages to the end destination.

In general, the SMS message and the retransmitted SMS message may be transmitted on the same modem or on different modems of the MS over the same or different air interfaces (e.g., LTE and CDMA). It should be noted that, in general, different air interfaces may utilize the same or different modems. Therefore, there may be one modem serving multiple air interfaces.

For certain aspects, the SMS message controller may receive requests from two or more clients to transmit a plurality of SMS messages using one or more modems. The SMS message controller may uniquely assign a controller message ID for each of the plurality of SMS messages (e.g., assign respective controller message IDs for the plurality of SMS messages).

For certain aspects, the SMS message controller may receive a controller message ID timeout notification, or a notification that the controller message ID is no longer in use (e.g., from the client or other components). The SMS message controller may then "release" that particular controller message ID, meaning it is allowed to be reassigned to one or more other requests for SMS transmission in the future. The SMS message controller may also reassign the controller message ID to another request for SMS transmission after a predefined duration of time is passed from the previous assignment of the controller message ID (e.g., even if not explicitly "released" by a client).

For certain aspects, the controller message ID sent over the air along with other elements of a teleservice ID may be used by the Network Messaging Center to differentiate the SMS messages from one another.

In some cases, the MS may receive a response message corresponding to a particular SMS message. The response message may include the controller message ID. The MS may reverse-map the controller message ID to the client message ID based on the mapping table that is stored in the MS. The MS may then forward the response message and possibly the client message ID to the corresponding client.

Dynamic Assignment of Message IDs

For certain aspects, in order to manage message IDs at the mobile station, the SMS message controller may dynamically assign message IDs to the requesting clients (e.g., applications). In this case, a client may query the SMS message controller of the MS and request an available message ID. The SMS message controller may provide the client with a token for a message ID out of a plurality of available addresses (e.g., a message ID pool). According to certain aspects, the message ID pool may be uniquely defined for the mobile station.

The SMS message controller may then return a message ID from the pool to the client. The message ID may be used by the client to send a SMS message.

Figure 5:
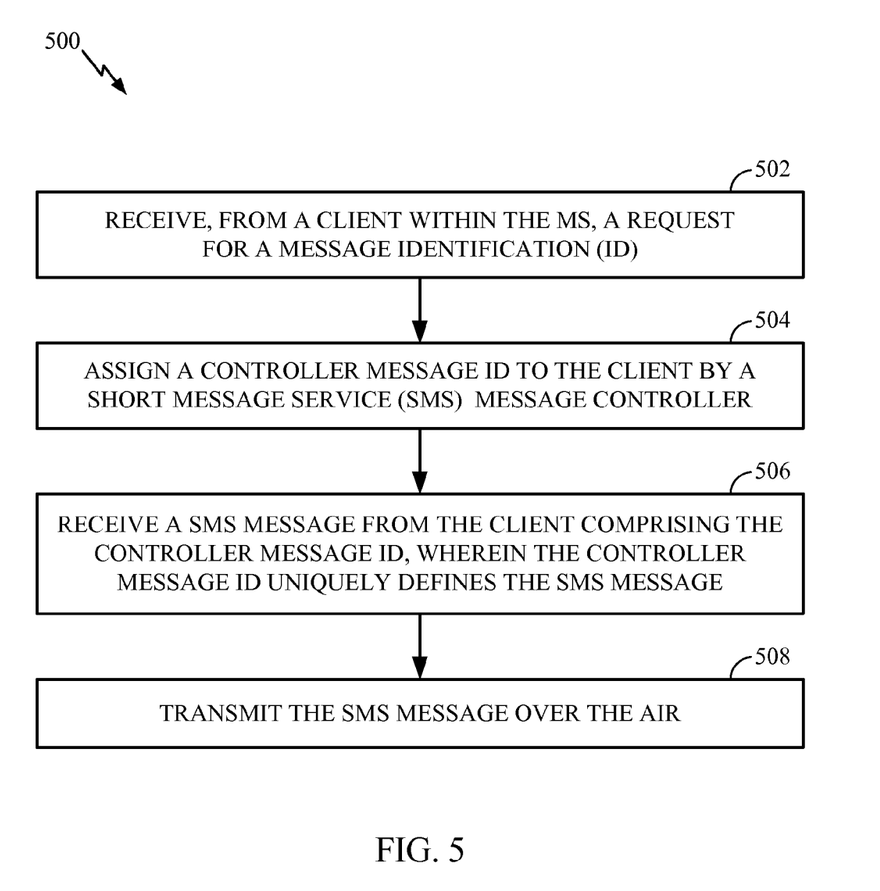
FIG. 5 illustrates example operations that may be performed by a multimode mobile station for dynamically assigning message IDs, in accordance with certain aspects of the present disclosure.

FIG. 5 illustrates example operations that may be performed by a multimode MS for dynamically assigning message IDs to clients, in accordance with certain aspects of the present disclosure.

At 502, a SMS message controller inside the MS receives a request for a message ID from a client within the MS. At 504, the SMS message controller assigns a controller message ID to the client. The controller message ID may be selected from a plurality of available message IDs (e.g., the message ID pool). At 506, the SMS message controller may receive a SMS message from the client which includes the controller message ID. The controller message ID uniquely defines the SMS message. At 508, the MS transmits the SMS message over the air.

As described above, the SMS message controller may receive a copy of the SMS message to be re-transmitted if a previous transmission of the SMS message failed. The copy of the SMS message may include the same controller message ID that was previously used for transmission of the SMS message. As described earlier, the SMS message and its retransmission may be transmitted on the same type of or different air interfaces using the same modem or a different modem.

For certain aspects, each client may include a mapping table for storing information about each SMS message. For example, the client may store a client message ID and the controller message ID and other related information in a mapping table. Thus, a client may be able to track assigned controller message IDs, re-use them when appropriate (e.g., for re-transmissions), or release them when appropriate.

Figure 6:
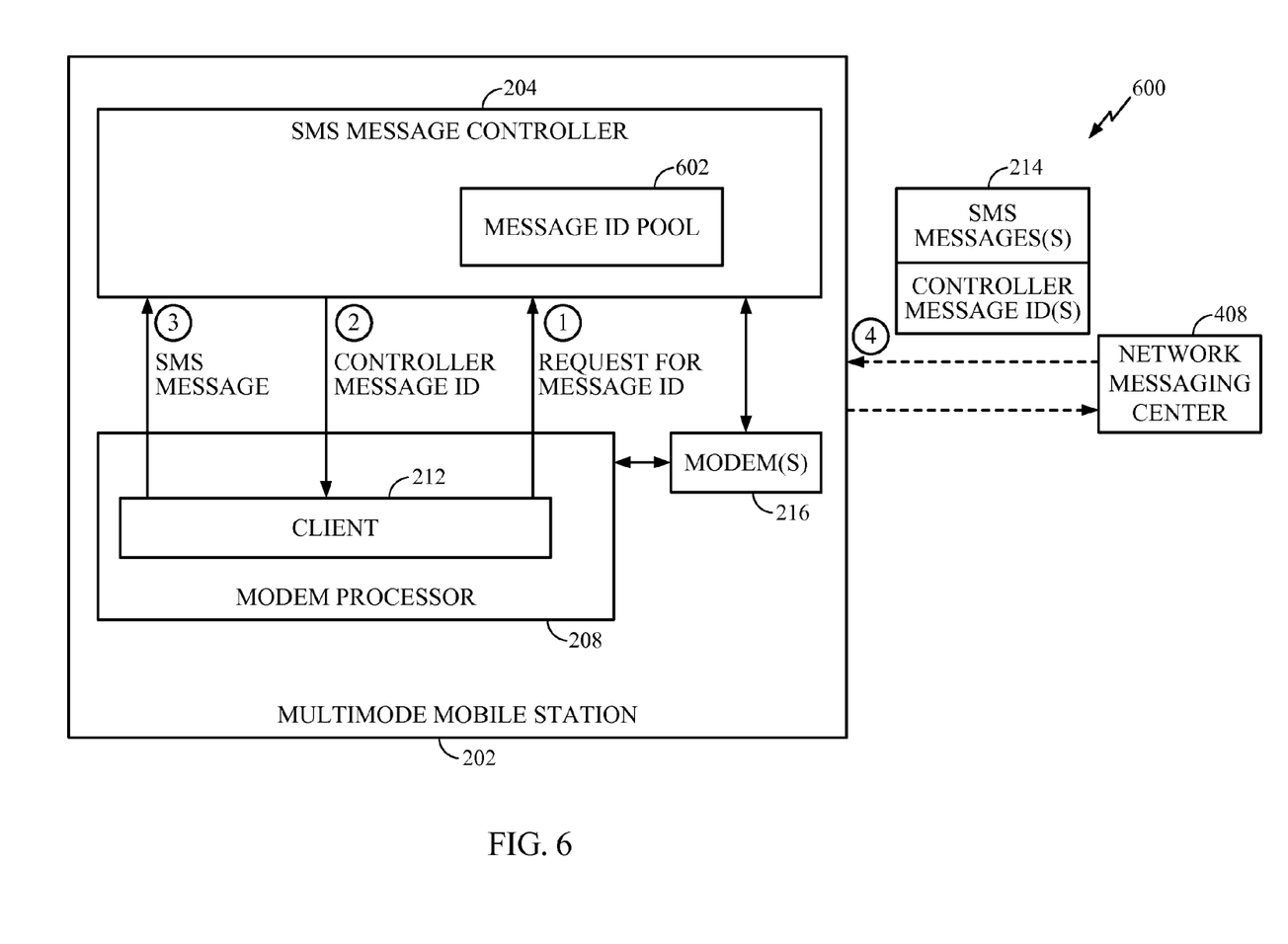
FIG. 6 illustrates an example multimode MS that dynamically assigns controller message IDs to SMS messages by performing operations illustrated in FIG. 5, in accordance of certain aspects of the present disclosure.

FIG. 6 illustrates an example multimode MS 202 that dynamically assigns controller message IDs to clients by performing operations illustrated in FIG. 5.

In the illustrated example, a client 212 residing on a modem processor 208 may send a request for a SMS message ID to the SMS message controller 204. The SMS message controller may assign a controller message ID (e.g., controller message ID 001) to the client 212 from a message ID pool 602. The message ID pool 602 may include a plurality of unique message IDs that are available for assignment.

The SMS message controller may notify the client of the assigned controller message ID. The client may receive the assigned controller message ID and update a mapping table with its client message ID (e.g., C1) and controller message ID (e.g., 001). The client may send a SMS message which includes the controller message ID to the SMS message controller to be transmitted over the air. Alternatively, the client may directly send the SMS message to a modem to be transmitted over the air.

In general, the SMS message controller may receive requests for message IDs from any number of clients within the MS, and assign unique controller message IDs to them. For certain aspects, the SMS message controller may keep track of the controller message IDs that are assigned to each client and possibly their corresponding client message IDs. As a result, similar or the same message IDs may be used for retransmissions of the same SMS message.

For certain aspects, a client may notify the SMS message controller that a controller message ID that was previously assigned to the client is no longer used. The SMS message controller may then release the controller message ID to be reassigned to one or more other requests for SMS transmission in the future. The released controller message ID may be stored in the message ID pool 602. For another aspect, the SMS message controller may reassign the controller message ID to another request for SMS transmission when a predefined duration of time is passed from the previous assignment of the controller message ID.

Static Assignment of Message IDs

For certain aspects, the SMS message controller may assign a plurality of message IDs to each SMS client (e.g., SMS originator) for future use. All of the clients intending to send SMS messages may register with the SMS message controller at the MS. The clients may request for a partition of Message ID space that is earmarked for their use. The message ID space may include a plurality of unique message IDs (message ID pool) that can be used to transmit SMS messages. A client may only generate messages with message IDs assigned to it.

As will be described in greater detail below, in some cases, clients that send frequent SMS messages may be allocated a greater proportion of available controller message IDs. In this manner, clients with a high "chattiness factor" may be able to send their messages without waiting while clients that send messages less frequently may be only assigned a few controller message IDs.

Figure 7:
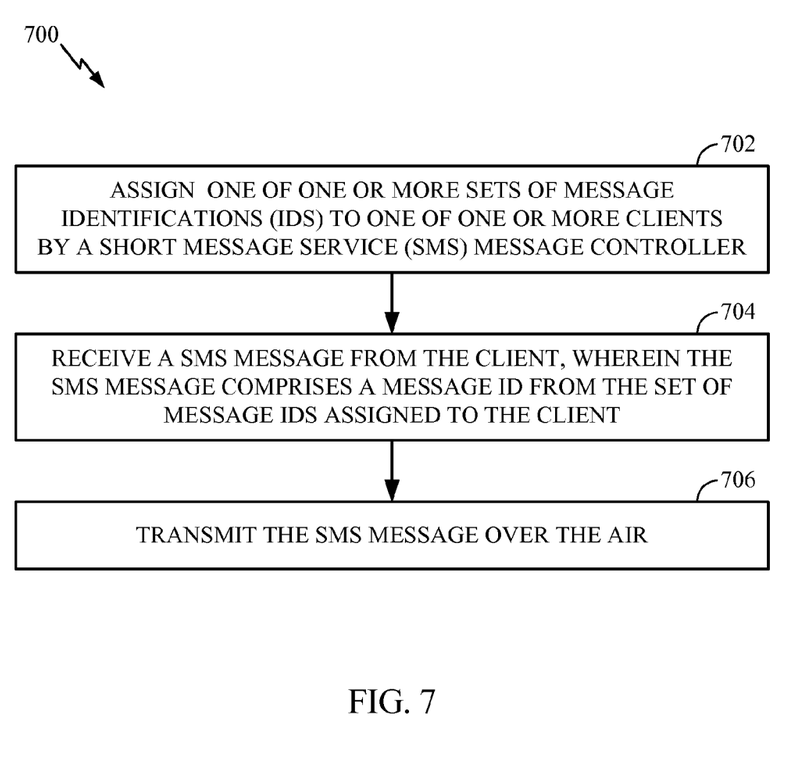
FIG. 7 illustrates example operations that may be performed by a mobile station for assigning a plurality of message IDs to each short message service (SMS) client, in accordance with certain aspects of the present disclosure.

FIG. 7 illustrates example operations 700 that may be performed by a multimode MS for assigning a plurality of message IDs to each SMS client, in accordance with certain aspects of the present disclosure. A SMS message controller inside a MS may receive a request for message ID assignment from one or more clients.

At 702, the SMS message controller may assign one of one or more sets of message identifications (IDs) to each one of the clients. For example, each client may be assigned a range of message IDs.

At 704, the SMS message controller may receive a SMS message from the client. The SMS message may include a message ID from the set of message IDs assigned to that client. At 706, the MS may transmit the SMS message over the air.

For certain aspects, the SMS message controller may receive an indication from the client that the SMS message needs to be retransmitted. The client may reuse the same message ID that was used for the initial transmission of the SMS message for the retransmission of the SMS message.

For certain aspects, number of message IDs in different sets of message IDs assigned to different clients may be different. For example, the number of message IDs in each set of message IDs may depend on a probability or frequency of SMS transmissions by each corresponding client.

For certain aspects, the MS may assign respective SMS "chattiness" grades to the clients based on the number and frequency of SMS transmission by the clients. The MS may divide available message IDs into one or more sets of message IDs based on the SMS chattiness grades assigned to the clients. The MS may then assign a message ID set to each client based on its SMS chattiness grade.

For example, the SMS chattiness grades may include three grades: SMS chatty, less chatty and least chatty. The SMS chatty grade may be assigned to the clients that transmit SMS messages very frequently. The less chatty grade may be assigned to the clients that transmit SMS messages less frequently than the clients in the SMS chatty grade. The least chatty grade may be assigned to the clients that transmit SMS messages occasionally. It should be noted that in general any number of grades may be defined for the chattiness of the clients.

Figure 8:
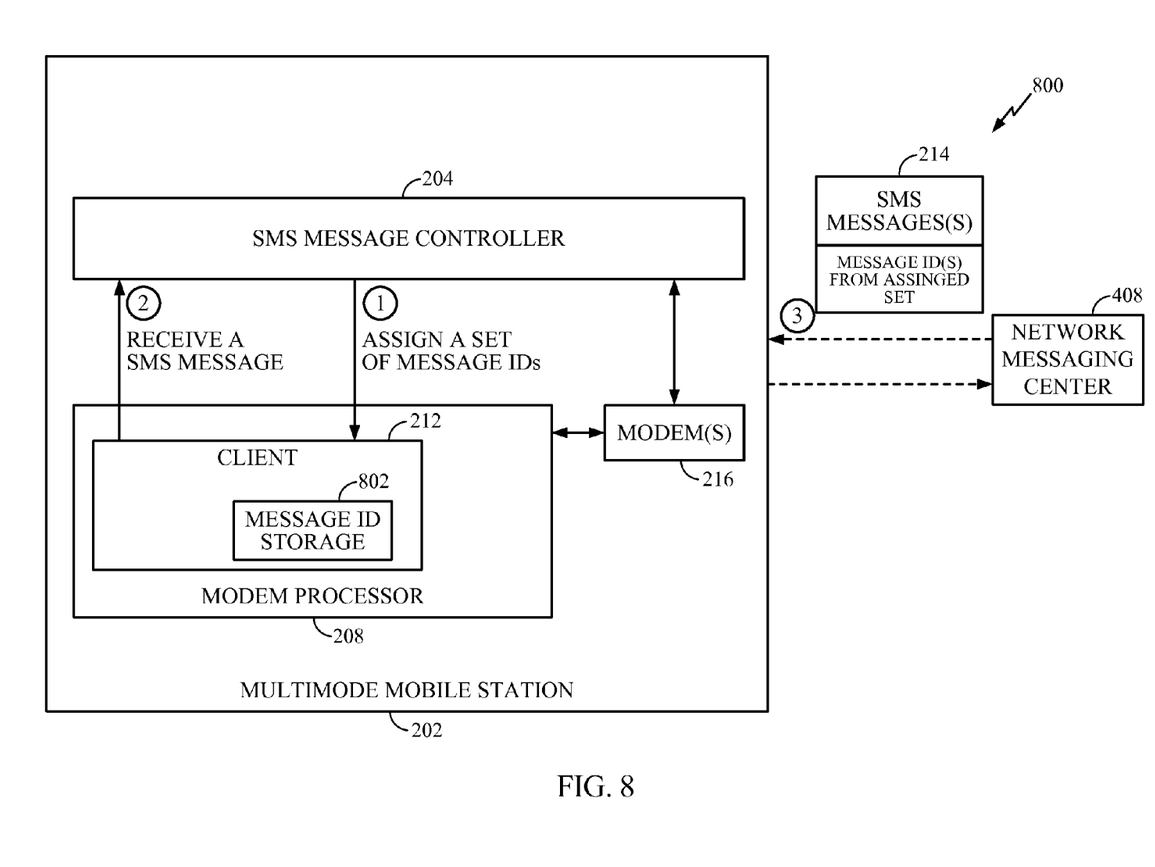
FIG. 8 illustrates an example multimode MS that statically assigns message IDs to clients by performing operations illustrated in FIG. 7, in accordance of certain aspects of the present disclosure.

FIG. 8 illustrates an example multimode MS 202 that statically assigns message IDs to clients by performing operations illustrated in FIG. 7.

In the illustrated example, a client 212 residing on a modem processor 208 may register with the SMS message controller to be assigned a set of message IDs. Based on SMS chattiness grade of the client 212, the SMS message controller 204 may assign a set of message IDs to the client. The client may store the assigned set of message IDs in a SMS ID storage unit 802. The client may generate a SMS message that uses one of the assigned message IDs.

The client may send the SMS message to the SMS message controller. The SMS message controller may then send the SMS message to a modem for transmission over the air. Alternatively, the client may directly send the SMS message to a modem for transmission over the air For certain aspects, the SMS message controller may receive a notification from a client if the set of message IDs assigned to that client is no longer in use. The SMS message controller may then release the set of message IDs to be reassigned to other clients in the future.

As described above, various aspects of the present disclosure allow efficient management and assignment of SMS message IDs that may help avoid not only collisions with different clients generating messages with the same message IDS, but also help detect duplicate messages by ensuring a same message ID is used for a re-transmission as was used for the original transmission.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for wireless communications by a multimode mobile station (MS), comprising:
receiving a request to send a short message service (SMS) message from a client within the MS, wherein the request comprises a client message identification (ID) and information regarding whether or not the SMS message is being retransmitted;
mapping the client message ID to a controller message ID by a SMS message controller, wherein the controller message ID is uniquely defined for each SMS message that is transmitted by the MS;
generating an SMS message based at least on the controller message ID; and
transmitting the SMS message over the air.

2. The method of claim 1, further comprising:
receiving a response message corresponding to the SMS message, wherein the response message comprises the controller message ID;
reverse-mapping the controller message ID to the client message ID based on a mapping table, wherein the mapping table is stored in the MS; and
forwarding the response message and the client message ID to the client.

3. The method of claim 2, further comprising:
receiving a second request from the client to re-send the SMS message if there is a failure in transmission of the SMS message, wherein the second request comprises the client message ID; and
reusing the controller message ID that was previously mapped to the client message ID to regenerate and retransmit the SMS message.

4. The method of claim 3, wherein the SMS message is transmitted on a first modem of the MS and the retransmitted SMS message is transmitted on a second modem of the MS.

5. The method of claim 3, wherein the SMS message is transmitted on a first air interface of the MS and the retransmitted SMS message is transmitted on a second air interface of the MS.

6. The method of claim 5, wherein:
the SMS message is transmitted on the first air interface using a first SMS transport mechanism; and
the SMS message is retransmitted on the second air interface using a second SMS transport mechanism different than the first SMS transport mechanism.

7. The method of claim 1, further comprising sending a failure indication to the client if at least one of transmission of the SMS message fails on a modem or a time-out happens.

8. The method of claim 1, wherein the MS comprises at least one of one or more modems (modulators/demodulators) or one or more application processors.

9. The method of claim 8, further comprising receiving requests from two or more clients to transmit a plurality of SMS messages using the one or more modems.

10. The method of claim 9, wherein the plurality of SMS messages uniquely correspond to respective controller message IDs.

11. The method of claim 1, wherein the MS is capable of simultaneously communicating on a plurality of radio interface technologies.

12. The method of claim 1, wherein generating the SMS message comprises constructing one or more fields in the SMS message corresponding to at least one of a teleservice layer or a transport layer.

13. The method of claim 1, further comprising storing at least one of a client identification, the client message ID, the corresponding controller message ID, or whether or not the SMS message is being retransmitted in a mapping table.

14. The method of claim 1, further comprising:
receiving a controller message ID timeout notification or a notification from the client that the controller message ID is no longer in use; and
releasing the controller message ID to be reassigned to one or more other requests for SMS transmission in the future.

15. The method of claim 1, further comprising reassigning the controller message ID to another request for SMS transmission when a predefined duration of time is passed from the previous assignment of the controller message ID.

16. The method of claim 1, wherein the client is an operating system client, an application residing on an application processor, an application residing on a modem processor or a user-initiated client.

17. An apparatus for wireless communications, comprising:
- a SMS message controller configured to receive a request to send a short message service (SMS) message from a client within the apparatus, wherein the request comprises a client message identification (ID) and information regarding whether or not the SMS message is being retransmitted, map the client message ID to a controller message ID, wherein the controller message ID is uniquely defined for each SMS message that is transmitted by the apparatus, and generate an SMS message based at least on the controller message ID; and
- a transmitter configured to transmit the SMS message over the air.

18. The apparatus of claim 17, wherein the SMS message controller is further configured to:
- receive a response message corresponding to the SMS message, wherein the response message comprises the controller message ID;
- reverse-map the controller message ID to the client message ID based on a mapping table, wherein the mapping table is stored in the apparatus; and
- forward the response message and the client message ID to the client.

19. The apparatus of claim 18, wherein the SMS message controller is further configured to:
- receive a second request from the client to re-send the SMS message if there is a failure in transmission of the SMS message, wherein the second request comprises the client message ID; and
- reuse the controller message ID that was previously mapped to the client message ID to regenerate and retransmit the SMS message.

20. The apparatus of claim 19, wherein the SMS message is transmitted on a first modem of the apparatus and the retransmitted SMS message is transmitted on a second modem of the apparatus.

21. The apparatus of claim 19, wherein the SMS message is transmitted on a first air interface of the apparatus and the retransmitted SMS message is transmitted on a second air interface of the apparatus.

22. The apparatus of claim 21, wherein:
- the SMS message is transmitted on the first air interface using a first SMS transport mechanism; and
- the SMS message is retransmitted on the second air interface using a second SMS transport mechanism different than the first SMS transport mechanism.

23. The apparatus of claim 17, wherein the SMS message controller is further configured to send a failure indication to the client if at least one of transmission of the SMS message fails on a modem or a time-out happens.

24. The apparatus of claim 17, further comprising at least one of one or more modems (modulators/demodulators) or one or more application processors.

25. The apparatus of claim 24, wherein the SMS message controller is further configured to receive requests from two or more clients to transmit a plurality of SMS messages using the one or more modems.

26. The apparatus of claim 25, wherein the plurality of SMS messages uniquely correspond to respective controller message IDs.

27. The apparatus of claim 17, wherein the apparatus is capable of simultaneously communicating on a plurality of radio interface technologies.

28. The apparatus of claim 17, wherein the SMS message controller is further configured to construct one or more fields in the SMS message corresponding to at least one of a teleservice layer or a transport layer.

29. The apparatus of claim 17, wherein the SMS message controller is further configured to store at least one of a client identification, the client message ID, the corresponding controller message ID, or whether or not the SMS message is being retransmitted in a mapping table.

30. The apparatus of claim 17, wherein the SMS message controller is further configured to:
- receive a controller message ID timeout notification or a notification from the client that the controller message ID is no longer in use; and
- release the controller message ID to be reassigned to one or more other requests for SMS transmission in the future.

31. The apparatus of claim 17, wherein the SMS message controller is further configured to reassign the controller message ID to another request for SMS transmission when a predefined duration of time is passed from the previous assignment of the controller message ID.

32. The apparatus of claim 17, wherein the client is an operating system client, an application residing on an application processor, an application residing on a modem processor or a user-initiated client.

33. A computer-program product for wireless communications by a multimode mobile station (MS), comprising a non-transitory computer readable medium having instructions stored thereon, the instructions being executable by one or more processors and the instructions comprising:
- instructions for receiving a request to send a short message service (SMS) message from a client within the MS, wherein the request comprises a client message identification (ID) and information regarding whether or not the SMS message is being retransmitted;
- instructions for mapping the client message ID to a controller message ID by a SMS message controller, wherein the controller message ID is uniquely defined for each SMS message that is transmitted by the MS;
- instructions for generating an SMS message based at least on the controller message ID; and
- instructions for transmitting the SMS message over the air.

34. An apparatus for wireless communications, comprising at least one processor configured to:
- receive a request to send a short message service (SMS) message from a client within the apparatus, wherein the request comprises a client message identification (ID) and information regarding whether or not the SMS message is being retransmitted,
- map the client message ID to a controller message ID by a SMS message controller, wherein the controller message ID is uniquely defined for each SMS message that is transmitted by the apparatus,
- generate an SMS message based at least on the controller message ID, and
- transmit the SMS message over the air; and
a memory coupled to the at least one processor.

* * * * *